July 24, 1962    J. J. HENDRICKSON    3,045,981
BAFFLE PLATE
Filed May 9, 1958    2 Sheets-Sheet 1

INVENTOR.
JOHN J. HENDRICKSON
BY Bosworth, Sessions,
Herrstrom + Knowles
ATTORNEYS July 24, 1962  J. J. HENDRICKSON  3,045,981
BAFFLE PLATE
Filed May 9, 1958  2 Sheets-Sheet 2

INVENTOR.
JOHN J. HENDRICKSON
BY Bosworth, Sessions,
Herrstrom + Knowles
ATTORNEYS.

United States Patent Office 3,045,981
Patented July 24, 1962

3,045,981
BAFFLE PLATE
John J. Hendrickson, Mentor, Ohio, assignor to Hendrickson Machine Company, Cleveland, Ohio, a corporation of Ohio
Filed May 9, 1958, Ser. No. 734,156
17 Claims. (Cl. 257—236)

This invention relates to shell and tube type heat exchangers, and more particularly to baffle plates for such heat exchangers.

Shell and tube heat exchangers are well known in the art and are employed for a variety of purposes. Such heat exchangers generally comprise a substantially cylindrical hollow shell or housing, having suitable inlet and outlet openings, and a plurality of parallel longitudinally extending tubes. The tubes are supported within the shell and are secured to and have communication at both ends with suitable headers also having inlets and outlets respectively so that one fluid is circulated into, through and out the respective tubes without mixing with a second fluid which is circulated through the shell and about the tubes. Generally the fluid to be treated (heated or cooled) circulates through the tubes and the treating (cooling or heating) or exterior fluid circulates within the shell and about the tubes and the fluids flow countercurrent for increased efficiency.

Such heat exchangers are normally provided with a plurality of baffle plates which are disposed within the shell and spaced along the longitudinal axis thereof and which have a plurality of apertures for receiving the tubes in order to support the same along their lengths and space them apart laterally. The baffle plates also function to improve the efficiency of the heat exchanger by increasing the turbulence of the fluid within the shell and directing and guiding the flow thereof so as to obtain more efficient contact between the fluid and the tubes. Thus the baffle plates usually have an exterior shape complementary to the interior shape of the shell but foreshortened in one direction so as to permit the exterior fluid to pass around the baffle plate and alternate plates are foreshortened in opposite directions so that the exterior fluid follows a zigzag path through the shell between the inlet and outlet, mixing and flowing across the tubes rather than in stratified layers parallel therewith.

Often the fluid which is to be treated and flow within the tubes would have a corrosive or deleterious effect on tubes formed from ordinary materials and it has become common under certain conditions, therefore, to provide such heat exchangers with extruded carbon tubes. Because of the method of manufacture and the nature of the material such carbon tubes are generally out of true and irregular longitudinally having portions which are displaced laterally relative to other longitudinally spaced portions. Further, carbon tubes are more easily abraded upon rubbing engagement with the baffle plates and are less able to take the strains incident to assembly and contraction and expansion during use than tubes formed from more common or harder materials. Further since extruded carbon tubes are not longitudinally true it is more difficult to insert the tubes within the aligned apertures of the spaced baffle plates and within the shell once insertion within the baffle plates is accomplished.

As a consequence baffle plates for shell and tube heat exchangers having extruded carbon tubes are usually provided with apertures which are markedly larger than the nominal external diameter of the tubes to the end that, both during and after assembly, the play within the apertures between the respective tubes and baffle plates allows for the longitudinal and cross-sectional irregularities of the tubes. Such an expedient has not proved entirely satisfactory, however, because the enlarged apertures permit the cooling or heating fluid in the shell to flow along the tube immediately adjacent thereto without being baffled in the aforesaid zigzag course. Thus the relatively large apertures previously made necessary by the nature of the carbon tubes has markedly reduced the overall efficiency of the heat exchangers by permitting a fluid film to form about and along the tubes and allowing a portion of the exterior fluid immediately adjacent the exterior of the tube to flow through the shell without baffling or substantially mixing with the rest of the fluid. Further the loose fit between the enlarged baffle plate apertures and the tubes increases the deleterious effects due to relative movement therebetween during assembly and use of the heat exchanger.

It is, therefore, a general object of this invention to provide an improved, more efficient, economical and foolproof baffle plate for shell and tube type heat exchangers and the like.

Other objects of this invention include the provision of an improved baffle plate for shell and tube type heat exchangers and the like which is particularly adapted for use with tubes which are irregular longitudinally and/or in cross-section; which supports the tubes firmly but without subjecting the same to any abrasive action; which effectively directs and baffles the flow of fluid within the shell and about the tubes; which markedly reduces and/or precludes relative movement between the adjacent portions of the respective tubes and the baffle plates; which substantially eliminates deleterious engagement and contact between the respective tubes and baffle plate; which is useful in existing heat exchangers without the necessity of modifying the same structurally; which may be formed from relatively light gauge metals; and which is flexible so as to facilitate the assembly of tubes and baffles and the insertion of such assembly.

Still further objects of this invention include the provision of a baffle plate for shell and tube heat exchangers, particularly adapted for use with tubes which are irregular longitudinally, having means firmly engaging and supporting the individual tubes, on the one hand, and displaceable with the respective tubes and relative to the remainder of the baffle plate, on the other hand, so as to compensate for the irregularity of the respective tubes between adjacent baffle plates and/or for relative longitudinal movement due to expansion and contraction of the tubes, which provides for maintaining the baffle plates in fixed longitudinal position so as to ensure the proper spacing between adjacent baffle plates; which allows the use of baffle plates closely fitting the interior diameter of the shell, which facilitates the use and installation of the tubes; which reduces the deleterious effects of the baffle plates on the tubes; which improves the baffling action by restricting more completely the flow of heating or cooling fluid adjacent the tubes and adjacent the interior periphery of the shell, which is economical to manufacture and use and which has and obtains one or more of the above advantages and objects.

These and other objects and advantages of this invention will appear from the following description of preferred and modified forms thereof, reference being had to the drawings in which.

Baffle plates embodying the instant invention will be described in connection with shell and tube type heat exchangers having extruded carbon tubes, however, it is to be understood that this is by way of example and that baffle plates embodying this invention may be used with other types of tubes and that other types of tubes may be used with baffle plates embodying this invention where and when it is desirable to obtain the advantages of this invention.

Briefly this invention comprises a baffle plate, for shell and tube heat exchangers and the like, which has a plurality of apertures therein and a plurality of tube supporting sleeves which slidably but snugly engage the respective tubes and in turn are loosely disposed within the respective apertures of the baffle plate and are adapted to have movement both laterally and longitudinally relative to the baffle plate. Thus the sleeves displace independently relative to the baffle plate to compensate for any longitudinal irregularity in the tube or expansion or contraction of the tubes during use of the heat exchanger and thereby minimizes damage to the tube due to relative movement between the respective tubes and baffle plate. Further this invention provides means inhibiting flow of fluid within the shell immediately along and parallel with the tubes even though the baffle plates have apertures, through which the tubes pass, which are substantially larger than the outside diameter of the tubes.

Figure 1:
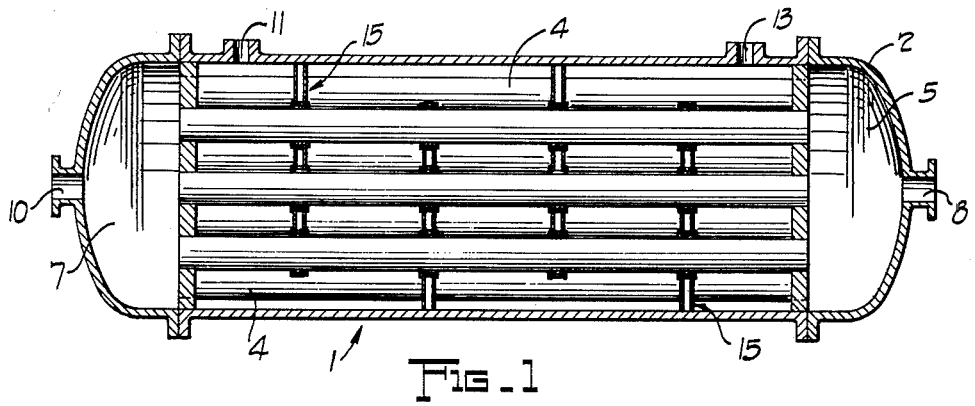
FIGURE 1 is a sectional view of shell and tube heat exchanger having baffle plates embodying a preferred form of this invention.
Figure 2:
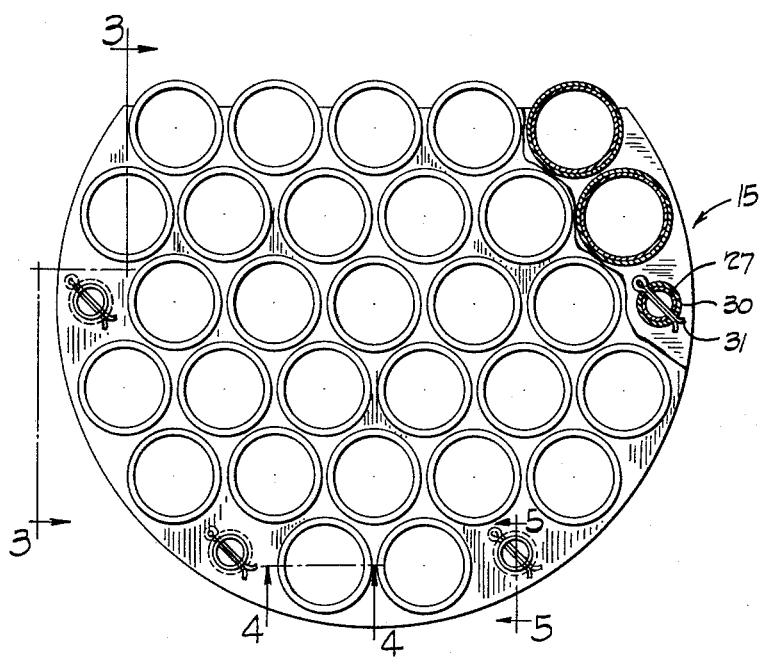
FIGURE 2 is a view partly in section and partly in elevation of a baffle plate embodying a preferred form of this invention.

More particularly, as best seen in FIGURE 1, this invention is adapted for use with a shell and tube type heat exchanger indicated generally at 1 and comprising a shell 2 and a plurality of parallel longitudinally extending tubes 4 having their respective ends opening into headers 5 and 7. Headers 5 and 7 have inlet and outlet openings 8 and 10 respectively and shell 2 has inlet and outet openings 11 and 13, respectively. The fluid to be heated or cooled enters the tubes through inlet 8 and header 5 and leaves through header 7 and outlet 10 while the exterior heating or cooling fluid enters the shell through inlet 11, flows countercurrent to the flow of the fluid within the tubes and leaves the shell through outlet 13. The tubes 4 are supported in proper spaced relationship within the shell 2, and the heating or cooling fluid is directed through a zigzag course within the shell and across the tubes by means of a plurality of longitudinally spaced baffle plates indicated generally at 15.

Baffle plates 15 have an external circumference which corresponds to the internal circumference of the shell except that one portion of the circumference comprises a chord to provide a passage through which the heating or cooling fluid may pass between the baffle plate and the shell. As seen in FIGURE 1, the baffle plates, while preferably being similar to each other, are reversed relative to each other within the shell so that the fluid passes around the bottom of one baffle plate and then around the top of the adjacent baffle plate.

Figure 3:
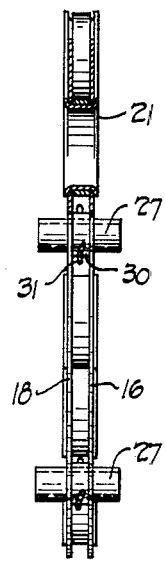
FIGURE 3 is a sectional view taken along line 3—3 of FIGURE 2.
Figure 4:
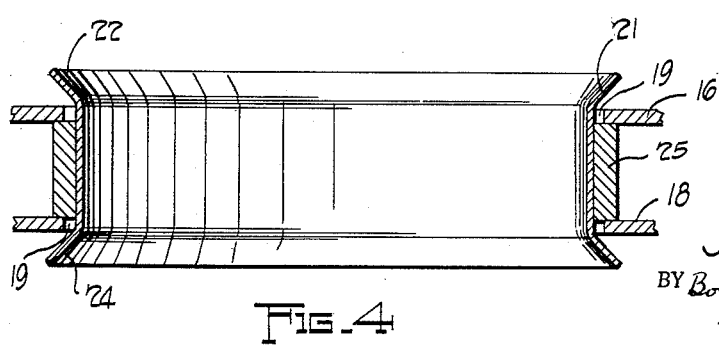
FIGURE 4 is a sectional view, on an enlarged scale, taken along the line 4—4 of FIGURE 2.
Figure 5:
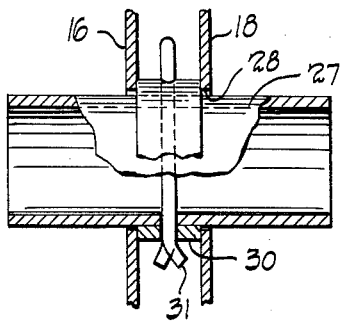
FIGURE 5 is a sectional view, on an enlarged scale, taken along the line 5—5 of FIGURE 2.
Figure 6:
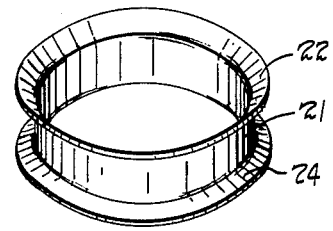
FIGURE 6 is a perspective view of a sleeve for use in a baffle plate embodying a preferred form of this invention.

Each baffle plate 15 embodying a preferred form of this invention comprises a pair of spaced parallel plate members 16 and 18 respectively, see FIGURES 3 and 4, having therein a plurality of longitudinally aligned apertures 19. Plate members 16 and 18 are preferably formed from relative thin gauge metal and are held in proper spaced relationship relative with each other in a manner to hereinafter more fully appear. In order to support the tubes in accordance with the precepts of this invention, a sleeve 21, see FIGURES 4 and 6, is disposed within each pair of aligned spaced apertures 19 in plates 16 and 18.

Each sleeve 21 is adapted to snugly though slidably engage a respective tube 4 and therefore has a diameter only slightly larger than the nominal outside diameter of the tubes. In order to preclude or reduce any abrasive rubbing engagement between the sleeve 21 and the tube 4 which might result from relative displacement or movement therebetween, I prefer that the respective ends 22 and 24 of each sleeve 21 be flared or curvd outwardly substantially as shown.

The exterior diameter of sleeve 21 is less than the diameter of the apertures 19 to the end the sleeve may move laterally within the aperture and the respective adjacent sleeves 21 engaging a said tube may be displaced laterally relative to each other to compensate for longitudinal irregularities in the tube. The radius and length of the curved ends 22 and 24 is such that the external diameter of the respective ends of the sleeve is greater than the diameter of the apertures 19 to the end that the sleeve is retained against longitudinal displacement from the baffle plate. Additionally and preferably the length of sleeve 21 is greater than the maximum distance between the outer faces of the plate members 16 and 18 to the end that the sleeve may have longitudinal movement relative to the plate members and so compensate for expansion and contraction longitudinally of the tubes relative to the shell and plates.

Thus in its preferred form, sleeve 21 is displaceable both laterally and longitudinally relative to the plate members. Further, sleeve ends 22 and 24 preferably extend raidally sufficiently to cover the space which would otherwise exist between the sleeve and the plate member even when the sleeve is displaced entirely to one side of the aligned apertures 19. The flared ends 22 and 24 of sleeve 21, therefore, also function to impede the flow of exterior cooling or heating fluid through the apertures 19 and adjacent the respective tubes and so aid in directing the flow of substantially all of the external fluid through the desired zigzag along the shell and across the tubes.

In order to ensure that the plate members 16 and 18 in each baffle plate 15 remain spaced apart a predetermined distance so as to provide sufficient support for the tubes and sleeve, it is preferred that a plurality of spacing rings 25, FIGURE 4, be mounted intermediate the plate members 16 and 18. Conveniently a spacing ring 25 surrounds each of the sleeves 21 and has a sliding engagement therewith and with the adjacent inner surfaces of the respective plate members so as not to impede the motion of the sleeve relative to the plate members. The length of the spacing rings, is, of course, equal to the distance at which the plate members are to be separated and the length of spacing ring 25 together with the thickness of plates 16 and 18 is preferably less than the length of the sleeve 21 intermediate the ends 22 and 24 as set forth above. When, as preferred, spacing ring 25 closely surrounds sleeve 21, it also functions to aid in preventing fluid from flowing through the apertures 19.

As best seen in FIGURES 1, 2, 3 and 5, the baffle plates 15 are preferably retained in predetermined longitudinally spaced relationship by means of a plurality of rods 27 which also function to hold and maintain the baffle plates in proper vertical position and transverse alignment relative to the shell and tubes. Rods 27 are conveniently hollow, longitudinally extending and parallel, and are adapted to pass through suitable aligned apertures 28 in the plate members 16 and 18 respectively. The respective baffle plates 15 are preferably maintained in proper longitudinal position on the rods 27 by means of support collars 30 which are disposed around the rods 27 intermediate the plate members 16 and 18 and fastening means, such as cotter pins 31, which extend through suitable holes in the collars 30 and rods 27. Collars 30 are preferably of slightly less length than the spacing collars 25 in order to provide for some relative longitudinal movement and flexibility between the plate members 16 and 18 and rods 27, and apertures 28 are of slightly larger diameter than the external diameter of rods 27 in order to provide for some relative lateral movement and flexibility between the plate members 16 and 18 and rods 27.

The play and flexibility between the baffle plates and rods and tubes facilitate the insertion of the assembled tubes and plates into the shell even though the edges of the plate members 16 and 18 have diameters sufficiently large to engage the interior wall of the shell and prevent fluid from flowing therealong.

A baffle plate 15 embodying a preferred form of this invention is conveniently made, for example, by stamping or punching out the respective plate members 16 and 18 including apertures 19 and 28 and providing a plurality of sleeves 21 which initially are flared at one end only, 22, for example. The sleeves 21 are then laid out in accordance with the pattern of the apertures 19 and a first plate member 16, for example, is placed thereover. The respective spacing collars 25 are then placed on the sleeves 21 and a second plate member 18 is then positioned over the sleeves and spacing collars. The other end 24 of the respective sleeves is then flared to complete the assembly. When it is desired to assemble the baffle plates 15, tubes 4 and rods 27, it is only necessary to provide rods 27 with suitably spaced holes for the reception of cotter pins 31 and then to slide the baffle plates 15 along the tubes and rods, provision first having been made for the support collars 30 by placing them intermediate the plates 16 and 18 and in alignment with apertures 28 before the baffle plates are slid over the ends of the rods. Once the respective plates are centered relative to the rods, the cotter pins 31 are passed through the collars 30 and rods 27 to hold the baffle plates in position. The entire tube and plate assembly is then inserted within the shell 2.

In use, the otherwise horizontally aligned sleeves are displaced laterally relative to each other and relative to the baffle plates to compensate for any longitudinal irregularities in the tubes as the plates and tubes are assembled. If during use the tubes expand, contract or distort longitudinally, the sleeves displace longitudinally and/or laterally relative to the baffle plates to compensate therefor.

Figure 7:
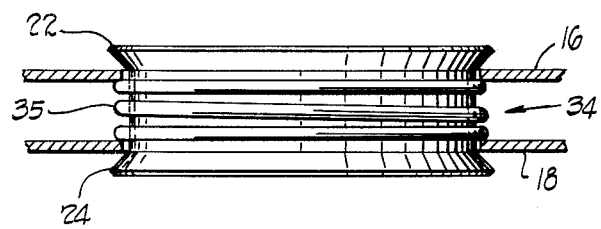
FIGURE 7 is a view similar to FIGURE 4 showing a modified form of this invention.

A baffle plate embodying a modified form of this invention is shown in FIGURE 7 and indicated generally at 34. Baffle plate 34 is substantially similar to baffle plate 15 (like reference characters refer to like parts) except that instead of spacing collars 25 baffle plate 34 is provided with spacing springs 35. Spacing springs 35 perform the same function as collars 25 in spacing the plate members 16 and 18 but also provide additional rigidity to the baffle plate by yieldably urging the plate members 16 and 18 against the flared ends 22 and 24 respectively of the respective sleeves 21.

Figure 8:
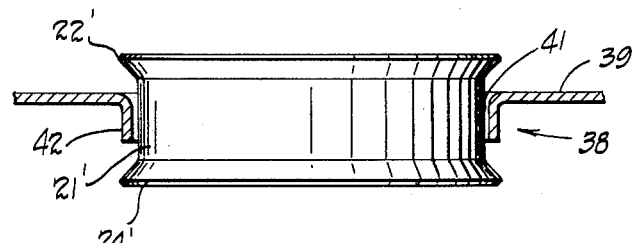
FIGURE 8 is a view similar to FIGURE 4 showing a further modified form of this invention.

A further modified form of this invention is embodied in the baffle plate shown in FIGURE 8 and is indicated generally at 38. Baffle plate 38 comprises a single plate member 39, which is preferably of substantially greater thickness than the respective plate members 16 and 18 in order to provide sufficient strength and rigidity and is provided with a plurality of flared apertures 41 having longitudinally extending support portions 42 respectively. Each support portion 42 is adapted to circumscribe and support a sleeve 21′ which is preferably similar in structure and function to the sleeve 21 of baffle plate 15 and has flared ends 22′ and 24′ respectively. Support portions 42 are of less length than the length of sleeves 21′ intermediate the flared ends thereof and have a diameter greater than the diameter of sleeve 21 but less than the maximum diameter of the flared ends 22′ and 24′ to the end that sleeve 21′ functions in substantially the same manner and for substantially the same purpose as sleeve 21. Plate member 39 is otherwise similar to plate members 16 and 18 in that the circumference thereof conforms to the internal circumference of the shell and a portion of the plate is cut on a chordal line to provide for flow of the heating or cooling fluid around the baffle plate and across rather than along the tubes. Baffle plates 38 are conveniently supported in proper longitudinal position by means of rods which are similar to rods 27 and which pass through suitable apertures, not shown, provided in plate 39.

Other changes and modifications to the preferred and modified forms of the invention herein particularly disclosed and described will occur to those skilled in the art who come to understand the principles and precepts thereof. Accordingly, the scope of this patent should not be limited to the specific forms of the invention here specifically disclosed and described but by the advance by which the invention has promoted the art.

I claim:

1. A baffle plate for a shell and tube heat exchanger and the like having tubes and a hollow shell with an interior wall, said baffle plate being adapted to be disposed in the shell and comprising a pair of spaced, parallel plate members each having an edge, said plate members being adapted to extend transversely of the shell and each said edge having a portion adapted to engage the interior wall of the shell and a portion adapted to be spaced from the interior wall of the shell when said baffle plate is disposed in the shell, said baffle plate also comprising a plurality of longitudinally aligned apertures in said plate members respectively, a sleeve in each aligned pair of said apertures, each said sleeve having an internal diameter adapted to closely though slidably engage over a tube, an external diameter less than the diameter of said pair of aligned apertures within which said sleeve is disposed and flared ends, said flared ends of each said sleeve having an external diameter greater than the external diameter of the sleeve by an amount greater than twice the difference between the external diameter of the sleeve and the diameter of the pair of aligned apertures, a spacing collar surrounding each said sleeve and disposed between said plate members and of greater internal diameter than the external diameter of the sleeve and having a sliding engagement with the sleeve and the adjacent surfaces of said plate members, said sleeves being of longer length intermediate said flared ends, respectively, than the sum of the thickness of said plate members and the length of said spacing collars respectively whereby said sleeves have movement longitudinally and transversely relative to said plate members and apertures, other pairs of aligned apertures in said plate members respectively, support rods extending through said other pairs of aligned apertures respectively and being of less external diameter than the diameter of said other pairs of aligned apertures respectively, a support collar surrounding each said support rod and positioned intermediate said plate members and being movable with respect thereto and fastening means securing each said support collar to the adjacent support rod.

2. A baffle plate for a shell and tube heat exchanger and the like having tubes and a hollow shell with an interior wall, said baffle plate being adapted to be disposed in the shell and comprising a pair of spaced, parallel plate members each having an edge, said plate members being adapted to extend transversely of the shell and each said edge having a portion adapted to engage the interior wall of the shell and a portion adapted to be spaced from the interior wall of the shell when said baffle plate is disposed in the shell, said baffle plate also comprising a plurality of longitudinally aligned apertures in said plate members respectively, a sleeve in each aligned pair of said apertures, each said sleeve having an internal diameter adapted to closely though slidably engage over a tube, an external diameter less than the diameter of said pair of aligned apertures within which said sleeve is disposed and flared ends, said flared ends of each said sleeve having an external diameter greater than the external diameter of the sleeve by an amount greater than twice the difference between the external diameter of the sleeve and the diameter of the pair of aligned apertures, a spacing collar surrounding each said sleeve and disposed between said plate members and of greater internal diameter than the external diameter of the sleeve and having a sliding engagement with the sleeve and said plate members, said sleeves being of longer length intermediate said flared ends respectively than the sum of the thickness of said plate members and the length of said spacing collars respectively whereby said sleeves have movement longitudinally and transversely relative to said plate members and apertures, other pairs of aligned apertures in said plate members respectively, support rods extending through said other pairs of aligned apertures and means securing said baffle plate to said support rods.

3. A baffle plate for a shell and tube heat exchanger and the like having tubes and a hollow shell with an interior wall, said baffle plate being adapted to be disposed in the shell and comprising a pair of spaced, parallel plate members each having an edge, said plate members being adapted to extend transversely of the shell and each said edge having a portion adapted to engage the interior wall of the shell and a portion adapted to be spaced from the interior wall of the shell when said baffle plate is disposed in the shell, said baffle plate also comprising a plurality of longitudinally aligned apertures in said plate members respectively, a sleeve in each aligned pair of said apertures, each said sleeve having an internal diameter adapted to closely though slidably engage over a tube, and an external diameter less than the diameter of said pair of aligned apertures within which said sleeve is disposed and flared ends, said flared ends of said sleeve having an external diameter greater than the external diameter of the sleeve by an amount greater than twice the difference between the external diameter of the sleeve and the diameter of the pair of aligned apertures and a spacing collar surrounding each said sleeve and disposed between said plate members and of greater internal diameter than the external diameter of the sleeve and having a sliding engagement with the sleeve and said plate members, said sleeves being of longer length intermediate said flared ends respectively than the sum of the thickness of said plate members and the length of said spacing collars respectively whereby said sleeves have movement longitudinally and transversely relative to said plate members and apertures.

4. A baffle plate for shell and tube heat exchangers and the like comprising a pair of spaced parallel plate members, a plurality of longitudinally aligned apertures in said plate members respectively, a sleeve in each aligned pair of said apertures, each said sleeve having an internal diameter adapted to closely though slidably engage over a tube of the heat exchanger, an external diameter less than the diameter of said pair of aligned apertures within which said sleeve is disposed and flared ends, said flared ends of each said sleeve having an external diameter greater than the external diameter of the sleeve and greater than the diameter of the said pair of aligned apertures within which said sleeve is disposed by an amount greater than twice the difference between the external diameter of the sleeve and the diameter of the pair of aligned apertures, and a spacing collar surrounding each said sleeve and disposed between said plate members and of greater internal diameter than the external diameter of the sleeve and having a sliding engagement with said sleeve and said plate members, said sleeves being of longer length intermediate said flared ends respectively than the sum of the thickness of said plate members and the length of said spacing collars respectively whereby said sleeves have movement longitudinally and transversely relative to said plate members and apertures.

5. A baffle plate for shell and tube heat exchangers and the like comprising a pair of spaced parallel plate members, a plurality of longitudinally aligned apertures in said plate members respectively, a sleeve in each aligned pair of said apertures, each said sleeve having an internal diameter adapted to closely though slidably engage over a tube of the heat exchanger, an external diameter less than the diameter of said pair of aligned apertures within which said sleeve is disposed and flared ends, said flared ends of each said sleeve having an external diameter greater than the external diameter of the sleeve by an amount greater than twice the difference between the external diameter of the sleeve and the diameter of the pair of aligned apertures, and spacing collar means surrounding each said sleeve and disposed between said plate members and having a sliding engagement with said sleeve and said plate members, said sleeves having movement longitudinally and transversely relative to said plate members and apertures.

6. The baffle plate according to claim 5 in which said spacing collar means comprises a spring.

7. A baffle plate for shell and tube heat exchangers and the like comprising a pair of spaced parallel plate members, a plurality of longitudinally aligned apertures in said plate members respectively, a sleeve in each aligned pair of said apertures, each said sleeve having an internal diameter adapted to closely though slidably engage over a tube of the heat exchanger, an external diameter less than the diameter of said pair of aligned apertures within which said sleeve is disposed and flared ends and also having movement longitudinally and transversely relative to said plate members, said flared ends of each said sleeve having an external diameter greater than the diameter of the pair of aligned apertures and spacing collar means surrounding each said sleeve and disposed between said plate members.

8. A baffle plate for shell and tube heat exchangers and the like comprising a pair of spaced parallel plate members, a plurality of longitudinally aligned apertures in said plate members respectively, a sleeve in each aligned pair of said apertures, each said sleeve having an internal diameter adapted to closely though slidably engage over a tube of the heat exchanger and an external diameter less than the diameter of said pair of aligned apertures within which said sleeve is disposed and having movement relative to said baffle plate members, spacing collar means surrounding said sleeve respectively and disposed between said plate members and means retaining said sleeves in said pair of aligned apertures respectively.

9. The baffle plate according to claim 8 in which said spacing collar means has sliding engagement with said sleeves respectively and said plate members, and said sleeves have flared ends and are of longer length intermediate said flared ends respectively than the sum of the thickness of said plate members and the effective length of said spacing collar means respectively whereby said sleeves have movement longitudinally and transversely relative to said plate members and apertures.

10. A baffle plate for shell and tube heat exchangers and the like comprising support plate means, a plurality of apertures in said plate means, a sleeve in each said aperture and having an internal diameter adapted to closely though slidably engage over a tube of the heat exchanger and an external diameter less than the diameter of said aperture and having transverse movement within said aperture relative to said plate means, and means retaining said sleeves in said apertures respectively.

11. The baffle plate according to claim 10 in which said last named means comprises flared ends on said sleeves, said flared ends being of greater diameter than the diameter of said apertures respectively.

12. The baffle plate according to claim 10 in which said baffle plate means comprises a single plate and includes an annular projection circumscribing each said aperture and extending perpendicularly from and formed integrally with said plate, and said sleeves extend within said projections respectively.

13. The baffle plate according to claim 12 in which said retaining means comprises flared ends on said sleeves, said flared ends are of greater diameter than said apertures respectively, and said sleeves are of greater length intermediate said flared ends, respectively, than the sum of the thickness of said plate and the length of said annular projections respectively whereby each said sleeve also has movement longitudinally relative to said plate.

14. In a baffle plate for a shell and tube heat exchanger, the combination of plate means having an aperture through which a tube of the heat exchanger may extend, a sleeve in said aperture adapted to encircle the tube and have a close sliding fit therewith, said sleeve being smaller externally than said aperture and having a loose fit therein admitting transverse movement relative to said plate means, and means retaining said sleeve in said aperture.

15. A baffle plate for shell and tube heat exchangers and the like comprising a pair of spaced parallel plate members having pairs of longitudinally aligned apertures, sleeves disposed in said pairs of aligned apertures respectively, said sleeves being adapted to engage over a tube of the heat exchanger and being of less external diameter than said apertures whereby to have transverse movement relative to said plate members, means retaining said sleeves in said apertures, respectively, and means permitting said sleeves to move longitudinally relative to said plate members.

16. A baffle plate for shell and tube heat exchangers and the like comprising a plate member being a predetermined thickness and a plurality of spaced apertures, and sleeves disposed in said apertures, respectively, each said sleeve having an internal diameter adapted to closely though slidably engage over a tube of the heat exchanger and an external diameter less than the diameter of said aperture and having flared ends of greater external diameter than the diameter of said aperture and spaced apart longitudinally a greater distance than the thickness of said plate whereby each said sleeve is retained in its said aperture and has transverse and longitudinal movement within said aperture and relative to said plate.

17. A baffle plate for shell and tube heat exchangers and the like comprising a plate member having a plurality of spaced apertures having predetermined diameters, sleeves loosely disposed in said apertures, respectively, each said sleeve being adapted to support a tube of the heat exchanger and having an internal diameter slightly larger than the external diameter of the tube to be supported thereby and an external diameter smaller than the diameter of said respective aperture, whereby said sleeves have transverse movement in said apertures respectively relative to said plate means, and means retaining said sleeves in said apertures, respectively.

References Cited in the file of this patent
UNITED STATES PATENTS

| | | |
|---|---|---|
| 960,364 | Mellin | June 7, 1910 |
| 1,500,895 | Rover | July 8, 1924 |
| 1,618,797 | Bennett | Feb. 22, 1927 |
| 1,704,097 | Muhleisen | Mar. 5, 1929 |
| 2,344,582 | Allee | Mar. 21, 1944 |
| 2,402,209 | Ryder | June 18, 1946 |
| 2,426,552 | Wertz | Aug. 26, 1947 |
| 2,498,145 | Timker | Feb. 21, 1950 |
| 2,508,655 | Silverman | May 23, 1950 |